United States Patent [19]

Ofner et al.

[11] Patent Number: 5,857,448
[45] Date of Patent: Jan. 12, 1999

[54] INJECTION SYSTEM FOR AN INTERNAL COMBUSTION ENGINE

[75] Inventors: Herwig Ofner, Stübing; Peter Herzog, Graz, both of Austria

[73] Assignee: Avl Gesellschaft für Verbrennungskraftmaschinen und Messtechnik m.b.H. Prof.Dr.Dr.h.c. Hans List, Graz, Austria

[21] Appl. No.: 855,484

[22] Filed: May 13, 1997

Related U.S. Application Data

[63] Continuation-in-part of Ser. No. 620,570, Mar. 22, 1996, Pat. No. 5,690,077.

[30] Foreign Application Priority Data

Mar. 23, 1995 [AT] Austria ............................ 518/95

[51] Int. Cl.⁶ .................................................. F02M 21/02
[52] U.S. Cl. .................................. 123/525; 123/527
[58] Field of Search ................................ 123/525, 527, 123/446

[56] References Cited

U.S. PATENT DOCUMENTS

| | | | |
|---|---|---|---|
| 4,485,787 | 12/1984 | Kato et al. .......................... | 123/446 |
| 4,606,322 | 8/1986 | Reid et al. .......................... | 123/575 |
| 5,379,740 | 1/1995 | Moore et al. ........................ | 123/478 |
| 5,678,524 | 10/1997 | Ofner et al. ........................ | 123/527 |
| 5,690,077 | 11/1997 | Ofner et al. ........................ | 123/525 |

FOREIGN PATENT DOCUMENTS

| | | | |
|---|---|---|---|
| 3204752 | 8/1983 | Germany ............................ | 123/527 |
| 3523855 | 1/1987 | Germany . | |

*Primary Examiner*—John T Kwon
*Attorney, Agent, or Firm*—Watson Cole Grindle Watson, P.L.L.C.

[57] ABSTRACT

To provide an injection system for an internal combustion engine operating on self-igniting liquefied gas as a fuel, and to minimize cavitation and related problems of fuel delivery as well as wear, the fuel tank is configured as a low-pressure storage tank which is connected to a pressure control unit that includes a fuel pumping unit for drawing fuel from the storage tank and delivering the fuel to the suction line of the fuel delivery device and a pressure release line which branches off the suction line and leads back to the storage tank, the pressure release line including a release valve for maintaining a constant interior pressure in the suction line above the vapor pressure of the liquefied gas. The injection system is configured as a leakage-free system.

9 Claims, 2 Drawing Sheets

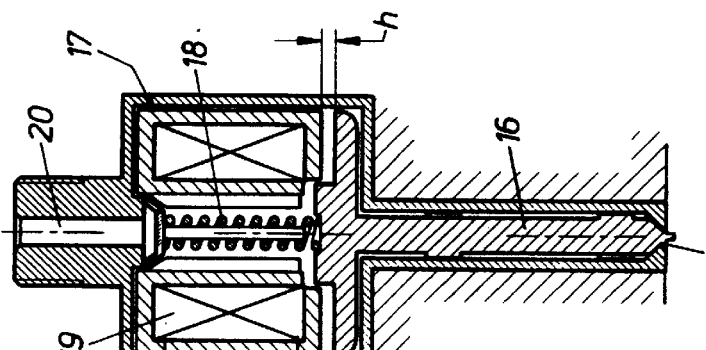
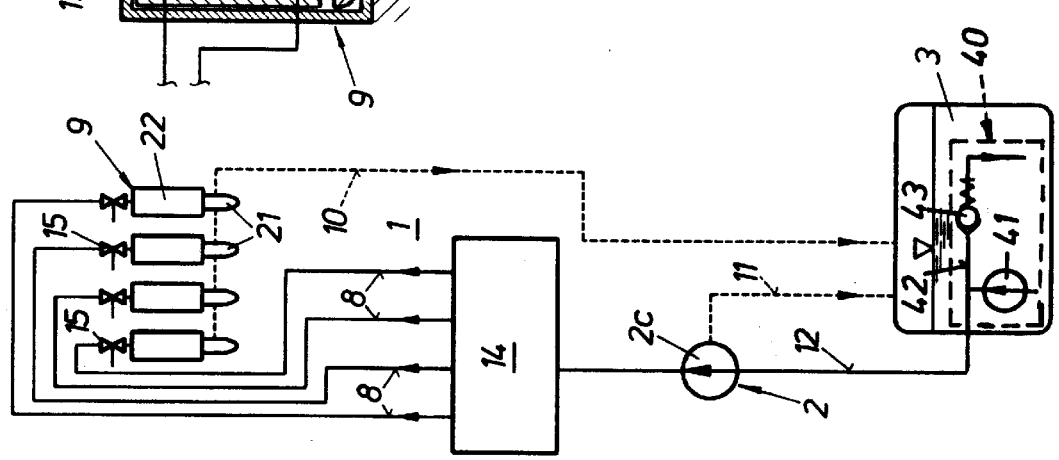
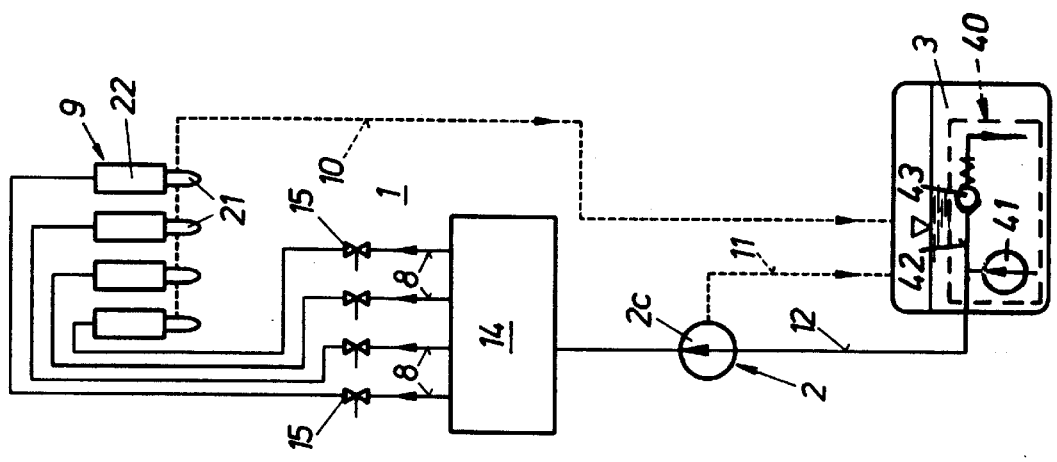
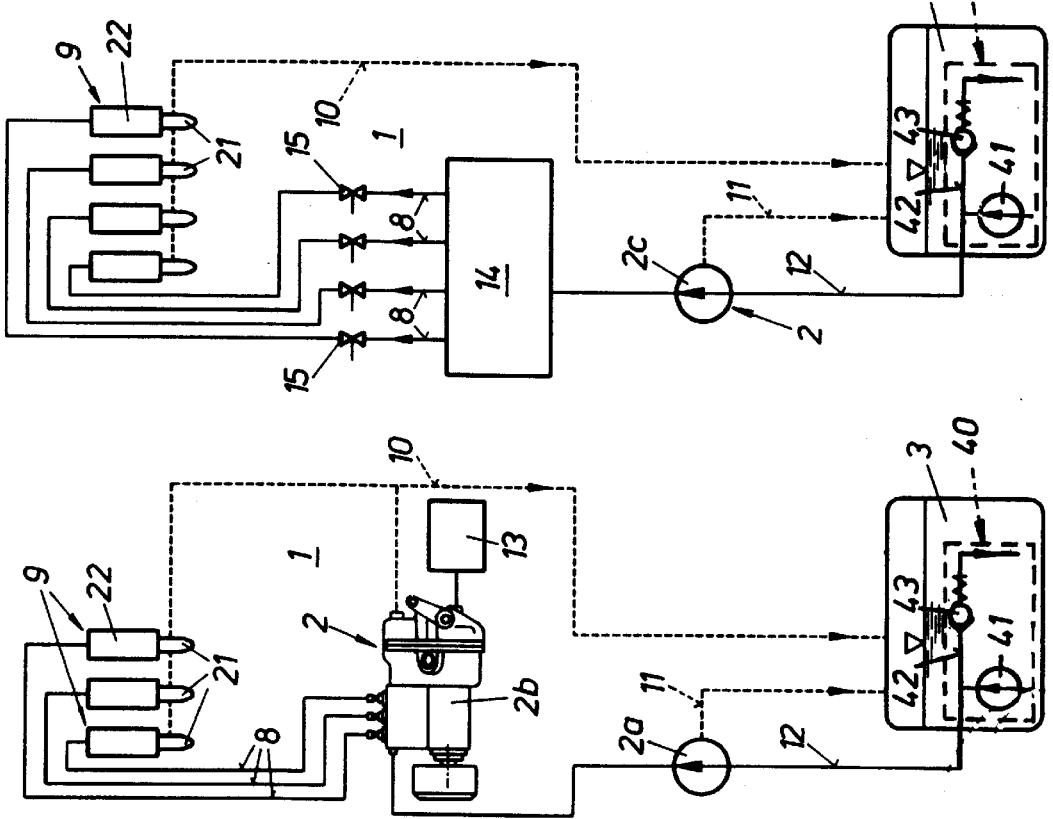

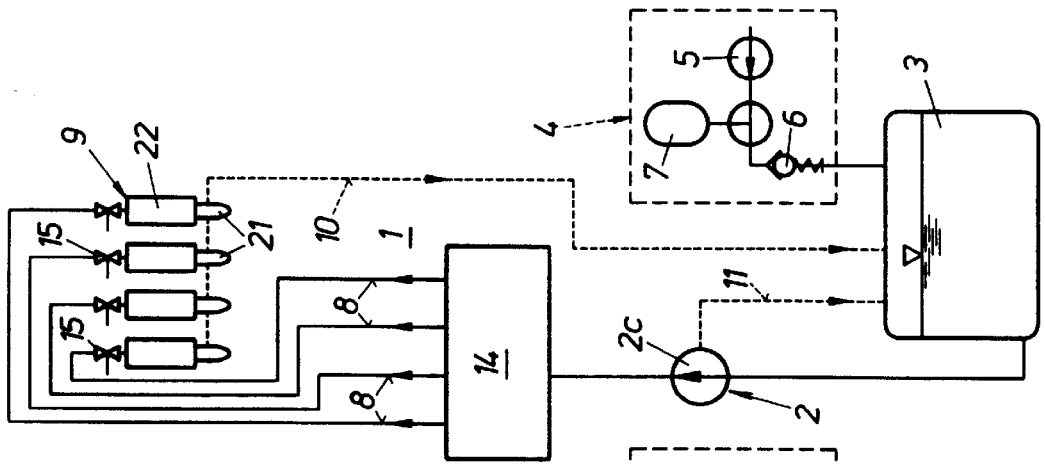
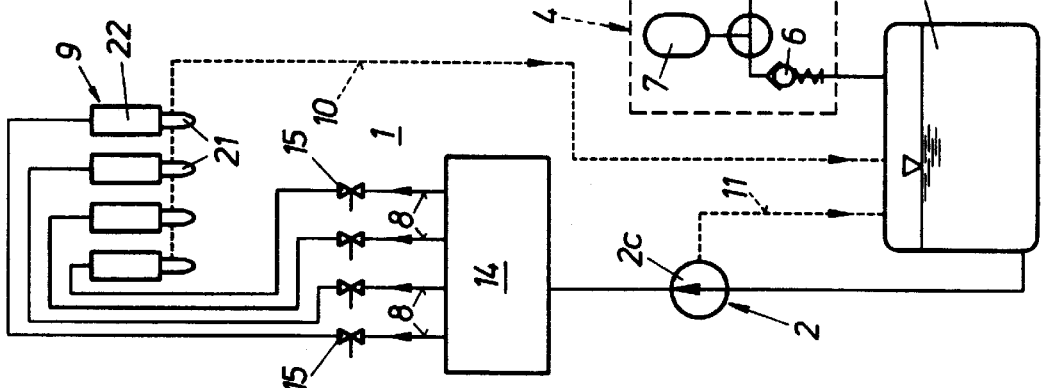
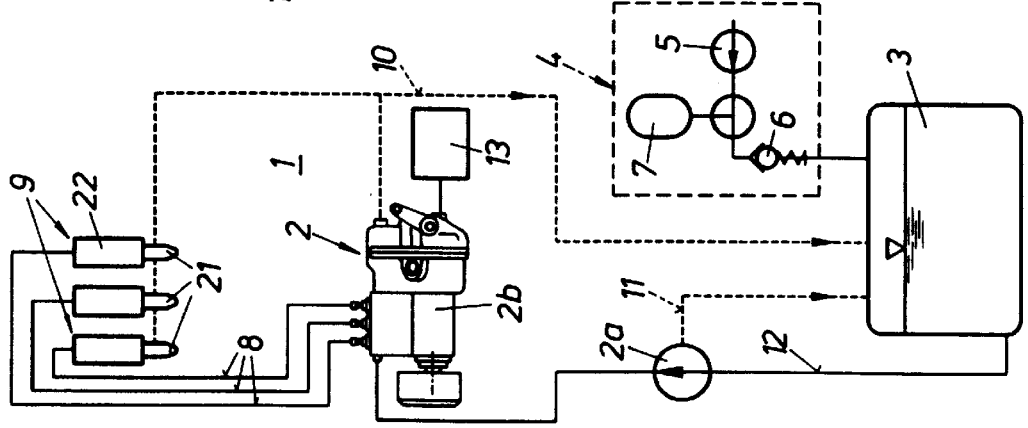

INJECTION SYSTEM FOR AN INTERNAL COMBUSTION ENGINE

CROSS REFERENCE TO THE RELATED APPLICATION

This application is a continuation-in-part of application Ser. No 08/620,570, filed Mar. 22, 1996, now U.S. Pat. No. 5,690,077.

BACKGROUND OF THE INVENTION

The present invention relates to an injection system for an internal combustion engine operating on self-igniting liquefied gas as a fuel, comprising an injection unit per cylinder for direct injection of the fuel into the combustion chamber, and a fuel tank, and a fuel delivery device for drawing the fuel from the fuel tank and delivering it to the injection unit.

Conventional injection systems are designed for injecting either self-igniting or extraneously ignited liquid fuels. At conditions of ambient pressure and ambient temperature, such fuels are provided in liquid form; as a consequence the storage tank is non-pressurized. Usually the liquid fuel is simultaneously employed as a lubricant for movable parts of the injection system. For this reason provisions are made for leakages and oil leakage pipes leading back to the tank.

DESCRIPTION OF THE PRIOR ART

In DE 35 23 855 A1 a method is described for operation of an internal combustion engine using a cracked gas obtained from methanol and air. Methanol is usually stored in depressurized condition in conventional storage tanks. The cracked gas, which is also known as synthetic gas, consists of hydrogen and carbon monoxide and is produced in a gas-producing unit at the pressure required for injection, which is in the range of 80–100 bar. The cracked gas is ignited either, by a spark or another fuel with good ignition qualities, such as diesel. Cracked gas is not a self-igniting liquefied gas. It is not directly injected into the combustion chamber of the engine but blown in indirectly at high pressure. Such an injection system cannot be used for direct injection of a self-igniting liquefied gas in an internal combustion engine operating on liquefied gas.

Another known type of fuel used in this context is a liquefied gas stored under pressure. The Russian Abstract SU 1040-206-A (Soviet Inventions Illustrated, Q53, 1984) describes a gas-operated internal combustion engine with a fuel tank for liquefied gas, i.e., butane, which is pressurized with the use of another compressed gas, i.e., methane. Conventional liquefied gases such as propane or butane are fuels whose ignition is effected by outside means and which are introduced into the combustion chamber as gases premixed with air (fuels for use with Otto engines).

Newly developed liquid gas fuels with high cetane number, such as dimethyl ether, have a vapor pressure of less than 30 bar at ambient temperature and may be used as self-igniting fuels. If such liquid gases are used with conventional diesel injection systems, the danger of cavitation will arise on account of the high vapor pressure of such fuels, in particular in areas of a local pressure drop, which will lead to fuel delivery problems and increased wear.

Moreover, fuel-leakage from the system into the environment must be prevented by all means since the fuel evaporates under normal ambient conditions and could form an ignitible or explosive mixture together with air. The prevention of leakages is rendered difficult by the high permanent pressure that must be maintained in the system to keep the fuel in its liquid state.

SUMMARY OF THE INVENTION

It is an object of the invention to avoid these disadvantages and to provide an injection system for self-igniting liquefied fuel gases in which the danger of cavitation and wear is minimized and outside leakages are prevented.

In the invention this object is achieved by configuring the fuel tank as a low-pressure storage tank which is connected to a pressure control unit maintaining a constant interior pressure within the suction line of the fuel delivery device at a level above that of the vapor pressure of the liquefied gas, preferably at 6 to 30 bar, approximately, and by providing that the injection system be leakage-free.

According a first variant of the invention the pressure control unit is connected to the suction line of the fuel delivery device and includes a fuel pumping unit for drawing fuel from the storage tank and delivering it to the suction line of the fuel delivery device. The pressure control unit further may include a pressure release line leading back to the fuel tank, which branches off from the suction line, wherein the pressure release line comprises a release valve for maintaining a constant interior pressure within the suction line. Preferably the pressure control unit is arranged inside of the fuel tank. The advantage of this arrangement is, that there are no sealing problems with the pressure control unit.

According a second variant the pressure control unit is provided with a gas pumping unit, preferably for air or nitrogen, which is connected to the interior of the low-pressure storage tank by one or more check valves.

It is provided in a preferred variant that the leakage-free fuel delivery device include a leakage-free pump for fuel withdrawal and a leakage-free injection pump, the latter preferably being lubricated by an external lubricating system. The external lubricant may be simultaneously used as a sealing fluid for the liquefied gas.

According to another variant of the invention the leakage-free fuel delivery device is provided with a leakage-free high-pressure pump delivering the liquefied fuel gas from the low-pressure storage tank to a high-pressure tank from which high-pressure lines lead to the individual injection units, a preferably electromagnetically-operated control valve being provided in the flow path between the high-pressure tank and the nozzle of the injection unit. Such an injection system exhibits elements of previous high pressure common rail injection systems, the novel feature being the use of a low-pressure storage tank in which the pressure level is maintained above vapor pressure by a pressure control unit. As the pressure of liquefied gas in the high-pressure tank need not exceed 200 bar, which is considerably less than would be required for diesel storage injection systems, a diaphragm pump may be employed as high-pressure pump.

Due to the lower absolute pressure level, the design of the control valves in the flow paths between the high-pressure tank and the nozzles may be kept simpler than that of control valves in diesel injection systems, or a different operating principle may be used altogether, e.g., actuation via a step motor.

It is provided in a preferred variant that the control valve be integrated in the injection unit.

Special preference is given to a variant in which the electro-magnetically operated control valve directly actuates the fuel needle. The comparatively low injection pressure of 200 bar will permit direct opening of the fuel needle by means of a solenoid.

The injection unit is preferably configured without oil leakage lines, i.e., it should only have a single connecting line whose flow is regulated by the control valve. The spring-loaded fuel needle is directly lifted against the force of the spring by the fuel pressure which acts in the valve chamber, like in conventional injection systems.

If existing engines are to be refitted with the new fuel injection system for liquefied gas it is recommended that the components low-pressure storage tank, high-pressure pump (diaphragm pump) and high-pressure tank are configured as a compact unit which can be attached to the existing engine.

BRIEF DESCRIPTION OF THE DRAWINGS

The invention will be further described with reference to the accompanying drawings, in which FIGS. 1–3 show different variants of injection systems as described by the invention for self-igniting liquefied fuel gases with a pressure control unit in a first embodiment, FIG. 4 shows a detail of another variant with an injection unit including an electromagnetically operated fuel needle, FIG. 5–7 show further different variants of injection system as described by the invention with a pressure control unit in a second embodiment.

Elements of the same function have the same reference numbers.

DETAILED DESCRIPTION OF PREFERRED EMBODIMENTS

FIGS. 1 and 5 show an injection system 1 according to the invention, for direct injection of liquefied gas, whose fuel delivery device 2 includes a fuel withdrawal or supply pump 2*a* and an injection pump 2*b* which may be configured as an inline injection pump or a distributor injection pump or the like. The liquefied fuel gas is stored in a low-pressure storage tank 3. Like in conventional injection systems, the injection pump 2*b* pressure lines 8 the injection pump 2*b* delivers the liquefied gas to the individual injection units 9. It would also be possible to combine the injection pump 2*b* and the injection units 9 into pump-nozzle elements. Each injection unit 9 comprises a nozzle 21 and a nozzle holder 22. If desirable, leakage lines 10 and 11 leading to the low-pressure tank may be provided. In this instance care must be taken that the system pressure will not fall below the vapor pressure in any part of the injection system 1, above all in the suction lines 12 and the leakage lines 10, 11. The aggregate units of the injection system, i.e., the fuel withdrawal pump 2*a*, the injection pump 2*b*, and the injection unit 9 must be designed so as to prevent any leakages to the outside. If these elements can be configured in such a way that no low-pressure level is required for operation, the leakage lines 10 and 11, which are indicated in the drawing by broken lines, become superfluous. The injection pump 2*b* may be lubricated by an external lubricating system bearing the reference number 13. The lubricant is simultaneously used as a sealing fluid for the liquefied gas.

If pressure control device 4 or 40 provides a sufficiently high pressure level, the withdrawal or supply pump 2*a* may be dropped.

As a contrast to FIGS. 1 and 5, FIGS. 2, 3, 6 and 7 show storage injection systems in which the liquefied gas is delivered from the low-pressure storage tank 3 to a high-pressure tank 14 by means of a leakage-free high-pressure pump 2*c*. The pressure in the high-pressure tank 14 may amount to 200 bar, for example. Because of the properties of the liquefied gases used in this context, there will be no need for higher pressures generally. The leakage-free diaphragm pump 2*c* is controlled either via pressure limiting or via the pump lift. In the high-pressure lines 8 leading from the high-pressure tank 14 to the injection units 9 solenoid valves 15 are provided which are actuated by means of a control unit not shown here in detail. As is shown in FIGS. 3 and 7, the valves 15 could also be integrated in the injection units 9.

In order to maintain a constant residual pressure within the suction line 12 upstream of the fuel delivery device 2 a pressure control unit 4, 40 is connected to the suction line 12 and/or to the low-pressure storage tank 3.

In FIG. 1 to 3 the pressure control unit 40 includes a fuel pumping unit 41 for delivering fuel from the fuel tank 3 to the suction line 12. Further the pressure control unit 40 includes a pressure release line 42, which branches off from the suction line 12 and leads back to the fuel tank 3 via a release valve 43. Via the fuel pumping unit 41 and the release valve 43, the pressure upstream the fuel delivery, i. e., within the suction line 12, is maintained above the vapor pressure of the liquefied gas. The pressure control unit 40 may be situated outside or more preverably, inside the fuel tank 3. The latter embodiment has the advantage that there will be no problems with sealing of the pressure control unit 40.

FIG. 5 to 7 show further embodiments of the invention, wherein via a pressure control unit 4, the pressure inside the low-preassure storage tank 3 is maintained above the vapor pressure of the liquefied gas. The pressure in the low-pressure tank is 6 to 30 bar, approximately.

The pressure control unit 4 is provided with a gas pumping unit 5 delivering air or nitrogen into the interior of the low-preassure tank via a check valve 6. If necessary, a pressure vessel 7 could be arranged between gas pumping unit 5 and low-preassure storage tank 3.

Due to the moderate injection pressure of 200 bar for liquefied fuel gas, which is low compared to conventional storage tank injection systems for diesel fuels, the fuel needle 16 of the injection valve 9 may be directly operated by the magnetic force of a solenoid 17 against the force of a spring 18, since the dimensions of the spring may be kept relatively small. In FIG. 4 the coil of the solenoid 17 is referred to as 19, while 20 denotes the fuel connection of the injection unit 9. If the fuel needle 16 is configured as a pintle-type nozzle, rate shaping may be achieved via variable flow regulation during the needle lift h.

We claim:

1. Injection system for an internal combustion engine operating on self-igniting liquefied gas as a fuel, comprising an injection unit per cylinder for direct injection of the fuel comprising self-igniting liquefied gas into a combustion chamber, a fuel tank containing storage fuel, a fuel delivery device having a suction line and a pressure line for delivering said fuel coming from said fuel tank to said injection unit, said fuel tank being a low-pressure storage tank, wherein a pressure control unit is connected to said suction line for maintaining a constant residual pressure within said suction line at a level above the vapor pressure of said liquefied gas, said pressure control unit including a fuel pumping unit for drawing fuel from said storage tank and delivering said fuel to said suction line of said fuel delivery device, and wherein the injection system is leakage-free, and wherein said pressure control unit further includes a pressure release line leading back to the storage tank which branches off from said suction line, said pressure release line including a release valve for maintaining a constant interior pressure within said suction line.

2. Injection system according to claim 1, wherein said pressure control unit is arranged inside said fuel tank.

3. Injection system according to claim 1, wherein said leakage-free fuel delivery device includes a leakage-free pump for fuel withdrawal and a leakage-free injection pump.

4. Injection system according to claim 3, wherein said injection pump is lubricated by an external lubricating system.

5. Injection system according to claim 1, wherein said leakage-free fuel delivery device is provided with a leakage-free high-pressure pump delivering said liquefied fuel gas from said suction line to a high-pressure tank, and including a control valve in a flow path between said high-pressure tank and a nozzle of the injection unit.

6. Injection system according to claim 5, wherein said high-pressure pump is a diaphragm pump.

7. Injection system according to claim 5, wherein said control valve is integrated in said injection unit.

8. Injection system according to claim 7, wherein said control valve is electromagnetically operated and directly actuates a fuel needle of said injection unit.

9. Injection system according to claim 1, wherein said injection unit is sealed. line.

\* \* \* \* \*